United States Patent
Akiyama et al.

(10) Patent No.: US 7,515,527 B2
(45) Date of Patent: Apr. 7, 2009

(54) SDH TRANSMISSION APPARATUS AND SIGNAL TRANSMISSION METHOD

(75) Inventors: Hiroyuki Akiyama, Kawasaki (JP); Takashi Fukagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 11/189,107

(22) Filed: Jul. 25, 2005

(65) Prior Publication Data
US 2006/0023630 A1 Feb. 2, 2006

Related U.S. Application Data

(63) Continuation of application No. PCT/JP03/06204, filed on May 19, 2003.

(51) Int. Cl.
*G01R 31/08* (2006.01)
(52) U.S. Cl. ..................... 370/217; 370/230
(58) Field of Classification Search ......... 370/386–388, 370/216, 217, 218, 210, 220, 221, 230
See application file for complete search history.

(56) References Cited

U.S. PATENT DOCUMENTS

| | | | | |
|---|---|---|---|---|
| 5,042,064 | A * | 8/1991 | Chung et al. | 379/112.04 |
| 5,291,552 | A * | 3/1994 | Kerrigan et al. | 379/266.04 |
| 5,412,652 | A * | 5/1995 | Lu | 370/223 |
| 2001/0029546 | A1* | 10/2001 | Motoyama | 709/235 |
| 2003/0041208 | A1* | 2/2003 | Volkmar | 710/316 |

FOREIGN PATENT DOCUMENTS

| | | |
|---|---|---|
| EP | 1 096 712 | 5/2001 |
| JP | 4-087434 | 3/1992 |
| JP | 5-167619 | 7/1993 |
| JP | 7-212358 | 8/1995 |
| JP | 8-204821 | 8/1996 |
| JP | 10-117175 | 5/1998 |
| JP | 2001-197083 | 7/2001 |
| JP | 2002-359628 | 12/2002 |

OTHER PUBLICATIONS

International Search Report dated Aug. 26, 2003 from corresponding International Application PCT/JP2003/06204.

* cited by examiner

*Primary Examiner*—Kwang B Yao
*Assistant Examiner*—Andrew Lai
(74) *Attorney, Agent, or Firm*—Fujitsu Patent Center

(57) ABSTRACT

An SDH transmission apparatus including a low-speed part, a high-speed part, and a cross-connect part is disclosed. The low speed part includes a first signal transmission part and a second signal transmission part, each signal transmission part including an active transmission part and a standby transmission part. In the SDH transmission apparatus, an active transmission part of the first signal transmission part transmits a signal to a first transmission line via the high-speed part, an active transmission part of the second signal transmission part transmits a signal to a second transmission line via the high-speed part, and a standby transmission part of the first signal transmission part sends a part of signals supplied to the first signal transmission part to the second transmission line via the high-speed part when a traffic amount of the signals supplied to the first signal transmission part exceed a predetermined value.

13 Claims, 9 Drawing Sheets

SDH TRANSMISSION APPARATUS AND SIGNAL TRANSMISSION METHOD

CROSS-REFERENCE TO RELATED APPLICATION

This application is a continuation U.S. application filed under 35 USC 111(a) claiming benefit under 35 USC 120 and 365(c) of PCT application PCT/JP2003/006204, filed on May 19, 2003. The foregoing application is hereby incorporated by reference.

BACKGROUND OF THE INVENTION

1. Field of the Invention

The present invention relates to a technology for effectively utilizing a band of a network formed by SDH transmission apparatuses. Especially, the present invention relates to a technology for effectively utilizing a band of a network formed by SDH transmission apparatuses to which switch apparatuses having a link aggregation function are connected.

2. Description of the Related Art

In recent years, there are many cases where a link aggregation function is implemented in layer 2 apparatuses (a switch apparatus is taken as an example of the layer 2 apparatus in the following description) for performing processes on frames of the Ethernet and the like. The link aggregation function is a function, that is defined in IEEE802.3ad, for bundling plural links so as to handle the links as one link.

For efficiently transmitting traffic of signals transmitted and received between the switch apparatuses, an upper layer signal of the Ethernet and the like is accommodated in a lower layer signal such as the SDH (Synchronous Digital Hierarchy) signal to be transmitted. Therefore, a configuration in which the switch apparatuses are connected to the SDH transmission apparatuses that forms the SDH network is adopted. By the way, although there is a case where SDH is called SONET, SDH is used as a term including the meaning of SONET in the following.

FIG. 1 shows an example of a configuration of a conventional SDH transmission apparatus. As shown in the figure, the SDH transmission apparatus includes a low-speed part 1 for receiving a signal of the Ethernet and the like and converting the signal into an SDH signal, a multiplexing-demultiplexing conversion part 2 for performing signal multiplexing-demultiplexing, cross-connection and the like, and high-speed parts 3 for performing input/output of the SDH signal. The multiplexing-demultiplexing conversion part 2 includes a parallel/serial conversion circuit 21 for performing parallel/serial conversion for signals, a cross-connect circuit 22 for performing cross-connection, and a cross-connect information setting circuit 23 for setting the cross-connect circuit 22.

In addition, the SDH transmission apparatus includes a clock supply circuit 4, a main signal switching circuit/control monitor circuit 5, an alarm collection/output circuit 6. As shown in FIG. 2, the switch apparatus is connected to the low-speed part 1. In addition, by connecting plural SDH transmission apparatuses via the high-speed parts, a ring structured SDH network can be constructed, for example.

The link aggregation function in the switch apparatus provides high-speed communications by bundling plural ports as one link. Therefore, when a communication failure occurs in a particular port in the plural ports, the switch apparatus is set so as to keep the communication by using remaining ports.

Therefore, in the configuration in which the switch apparatus is connected to the SDH transmission apparatus that forms the SDH network, there is a following problem.

FIG. 3 is a figure showing a configuration in which a switch apparatus 11 and a switch apparatus 31 are connected to an SDH network including an SDH transmission apparatus 10 and an SDH transmission apparatus 30, so that communication is performed between the switch apparatuses 11 and 31 via the SDH transmission apparatuses 10 and 30. As shown in FIG. 3, the SDH transmission apparatus 10 includes Gigabit Ethernet termination parts 12 and 13 (shown as "GbE") as the low-speed parts. The SDH transmission apparatus 30 includes Gigabit Ethernet termination parts 32 and 33 as the low-speed parts.

In the example shown in FIG. 3, a port A is connected to the Gigabit Ethernet termination part 12, and a port B is connected to the Gigabit Ethernet termination part 13 between the switch apparatus 11 and the SDH transmission apparatus 10. The ports and the Gigabit Ethernet termination parts are similarly connected between the switch apparatus 31 and the SDH transmission apparatus 30. In addition, between the switch apparatus 11 and the switch apparatus 31, a link 1 for connecting between the port A and the port C, and a link 2 for connecting between the port B and the port D are formed. Traffic data of X Mbps are transmitted on the link 1, and traffic data of Y Mbps are transmitted on the link 2.

By the link aggregation function of the of (X+Y) Mbps. In a lower layer level between the SDH transmission apparatuses 10 and 30, the link 1 and the link 2 are accommodated in separate paths. It is assumed that traffic of the link 1 is transmitted on a path 1, and traffic of the link 2 is transmitted on a path 2. In the present specification, "path" may be called "transmission line".

From the normal state shown in FIG. 3, it is assumed that a failure occurs between the port B of the switch 11 and the Gigabit Ethernet termination part 13. That is, for example, it is assumed that a failure of the port B, a line failure between the port B and the Gigabit Ethernet termination part 13, or the like occurs. Then, settings of the switch apparatuses 11 and 31 are changed to maintain the traffic of (X+Y) Mbps regarded as one link only by using the link 1.

Therefore, as shown in FIG. 4, the traffic that has been flowing through the path 2 is changed to flow through the path 1. That is, although each of the path 1 and path 2 between the SDH transmission apparatuses 10 and 30 normally uses a band corresponding to X Mbps or Y Mbps, it is necessary to provide each path with a band of (X+Y) Mbps against the above-mentioned failure. That is, it is necessary to prepare a band of 2 (X+Y) Mbps between the SDH transmission apparatuses. By the way, assuming such a situation, a margin of band is also provided between the switch apparatus and the SDH transmission apparatus.

As mentioned above, according to the conventional technology, there is a problem in that it is necessary to provide a redundant path band in between the SDH transmission apparatuses against the above-mentioned failure. A patent document: Japanese Laid-Open Patent Application No. 10-117175 relates to the SDH transmission apparatus.

SUMMARY OF THE INVENTION

An object of the present invention is to solve the above-mentioned problem so as to provide a technology for efficiently utilizing band of the network formed by the SDH transmission apparatuses that connect switch apparatuses using the link aggregation function.

The above object is achieved by an SDH transmission apparatus including a low-speed part, a high-speed part, and a cross-connect part for multiplexing a signal of the low-speed part side into a signal of the high-speed part side, wherein:

the low speed part includes a first signal transmission part and a second signal transmission part, each signal transmission part including an active transmission part and a standby transmission part;

the SDH transmission apparatus is configured such that an active transmission part of the first signal transmission part transmits a signal to a first transmission line via the high-speed part, and an active transmission part of the second signal transmission part transmits a signal to a second transmission line via the high-speed part; and the SDH transmission apparatus includes a transmission control part for causing a standby transmission part of the first signal transmission part to send a part of signals supplied to the first signal transmission part to the second transmission line via the high-speed part when a traffic amount of the signals supplied to the first signal transmission part exceed a predetermined value.

According to the present invention, in the configuration in which the low-speed part receives traffic from a switch apparatus (layer 2 apparatus) having the link aggregation function, even when one of links bundled by the link aggregation fails so that originally flowing traffic and traffic that has been flowing in the filed link are supplied to the first signal transmission part, a part of the supplied traffic can be transferred to the second transmission line from the standby transmission line of the first signal transmission part. Therefore, it is not necessary to prepare redundant band in a transmission line in a relay section that was conventionally necessary.

The transmission control part may include a part for receiving a signal output from the standby transmission part of the first signal transmission part and a signal output from the active transmission part of the second signal transmission part so as to select a normal signal from among the received signals and output the normal signal. A transmission line abnormal signal is supplied to the standby transmission part of the first signal transmission part when the traffic amount does not exceed the predetermined value, so that the above-mentioned part output signals received from the active transmission part under a normal condition. When the traffic amount exceeds the predetermined value, the transmission line abnormal signal supplied to the standby transmission part of the first signal transmission part is stopped.

DETAILED DESCRIPTION OF THE PREFERRED EMBODIMENTS

In the following, embodiments of the present invention are described with reference to figures.

First, an outline configuration of the embodiment is described with reference to FIG. 5. For the sake of convenience for making descriptions clearly understandable, only a case where a signal is transmitted from left to right is described.

Figure 1:
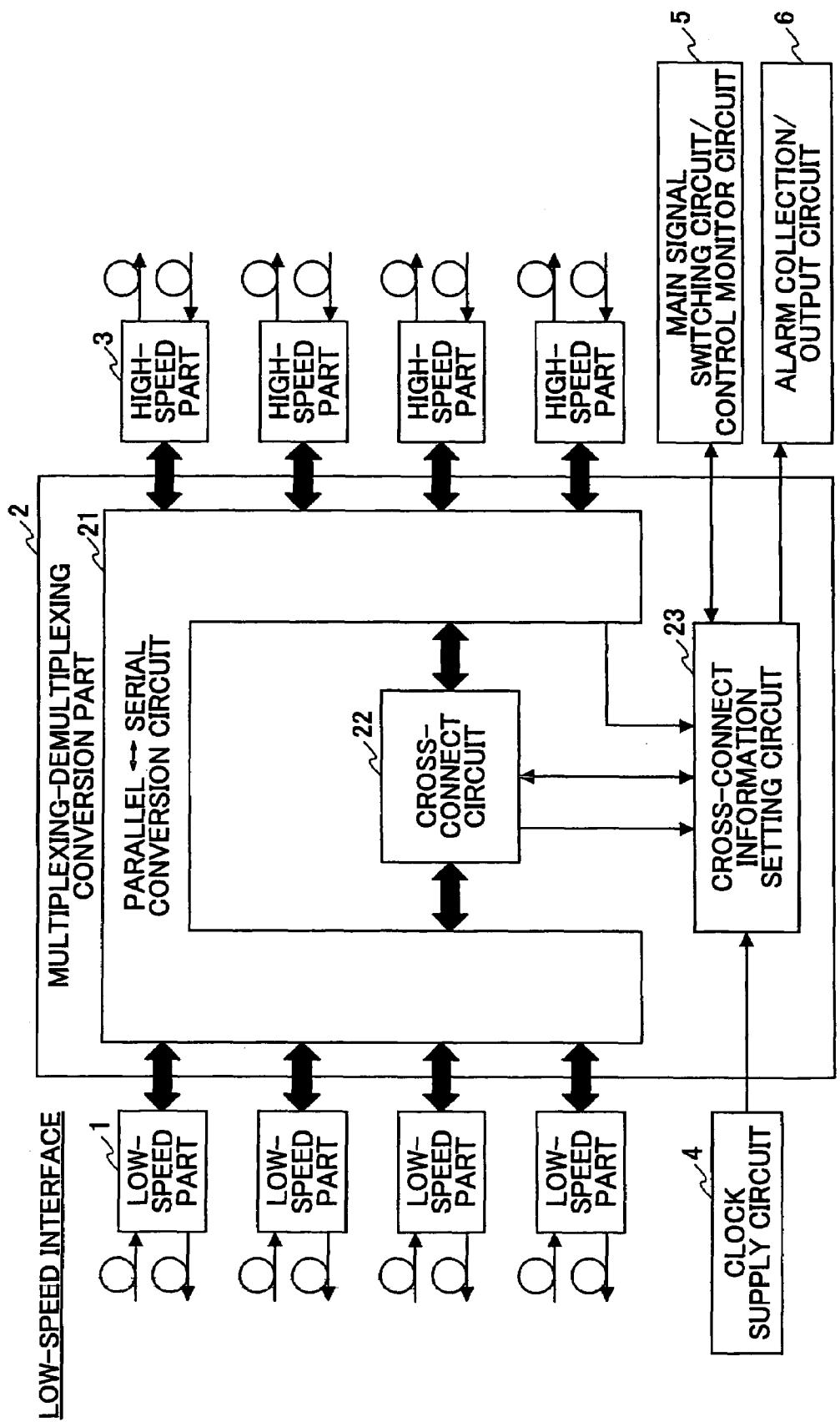
FIG. 1 is a diagram showing an example of a configuration of a conventional SDH transmission apparatus.
Figure 2:
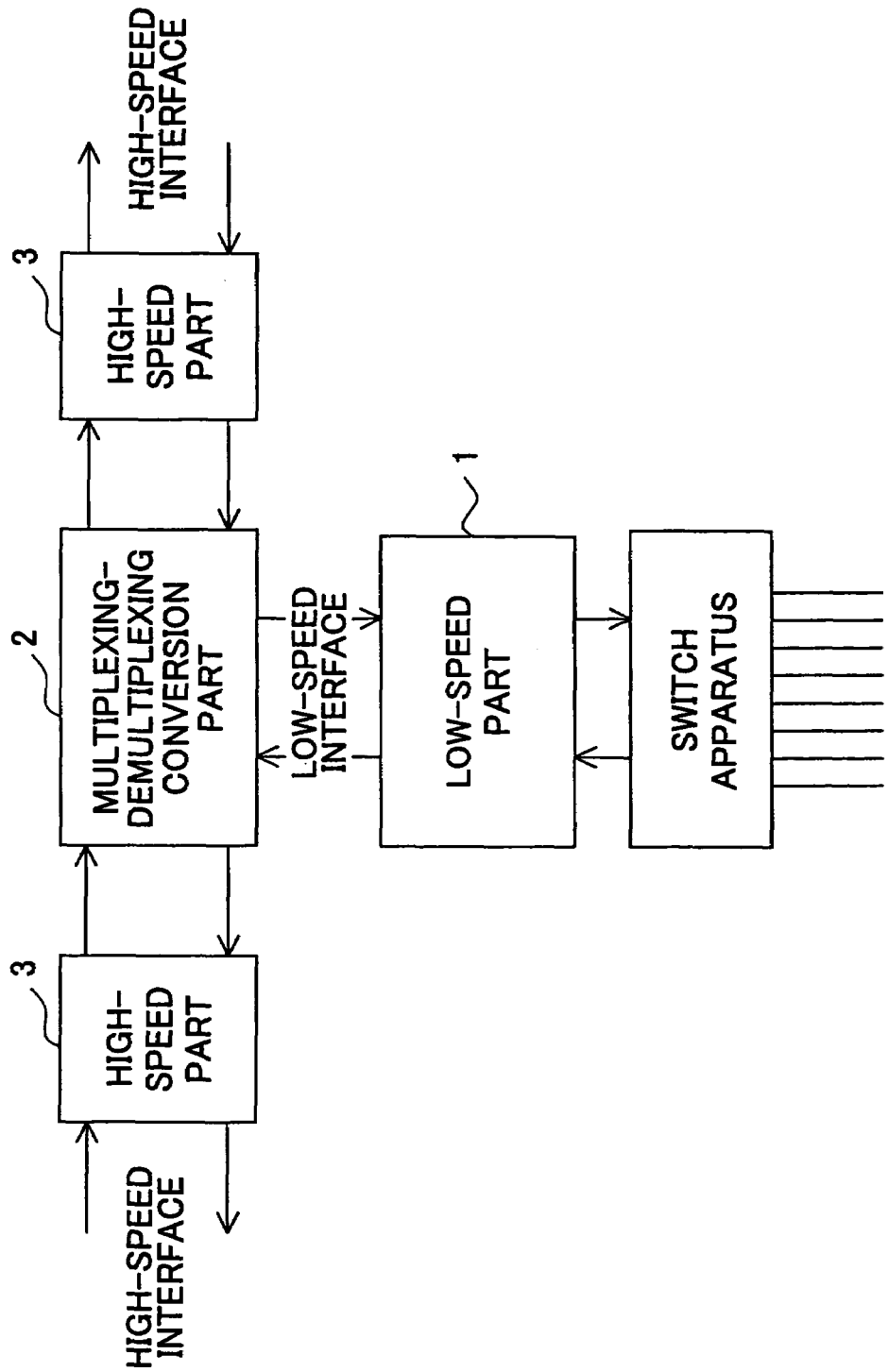
FIG. 2 is a diagram showing an example of a configuration in a case where a switch apparatus is connected to a low-speed part 1.
Figure 3:
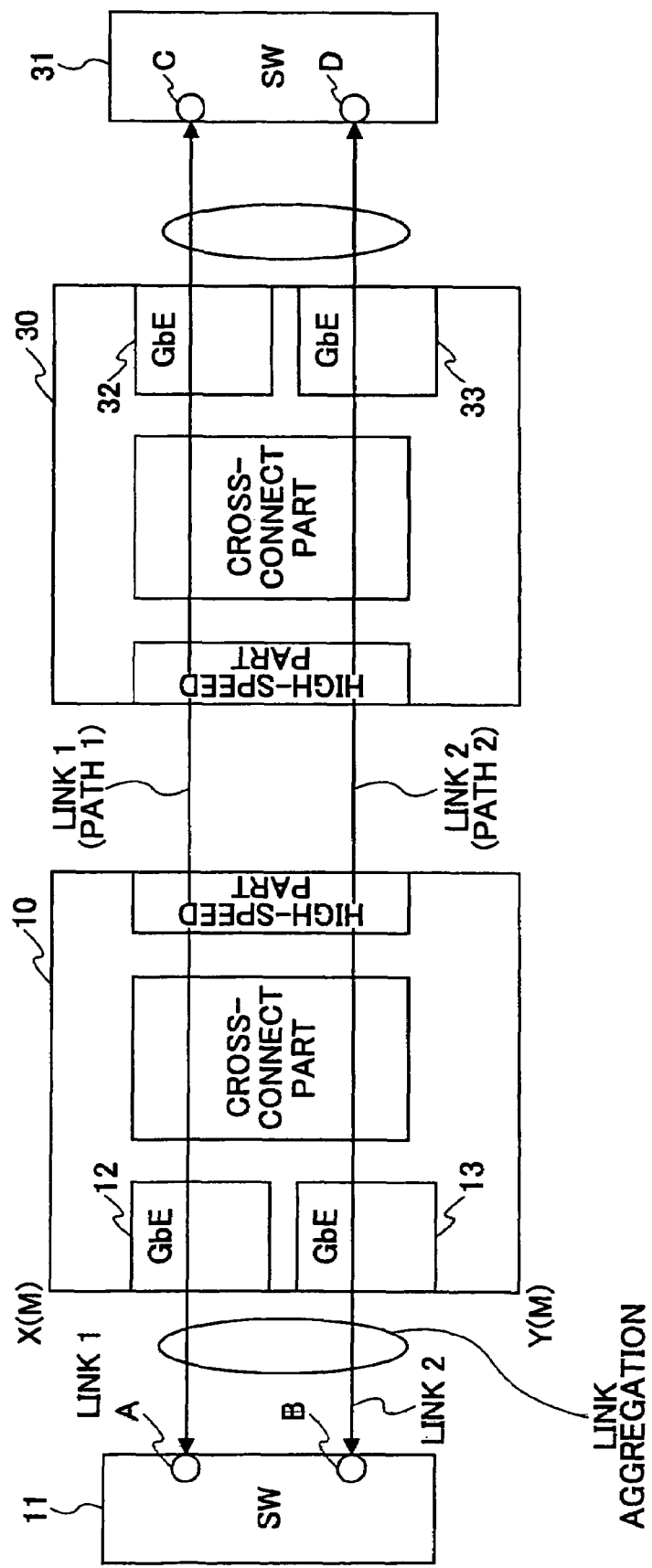
FIG. 3 is a diagram showing a configuration in which, a switch apparatus 11 and a switch apparatus 31 are connected to a SDH network including a SDH transmission apparatus 10 and a SDH transmission apparatus 30 so that communication is performed between the switch apparatuses 11 and 31 via the SDH transmission apparatuses 10 and 30.
Figure 4:
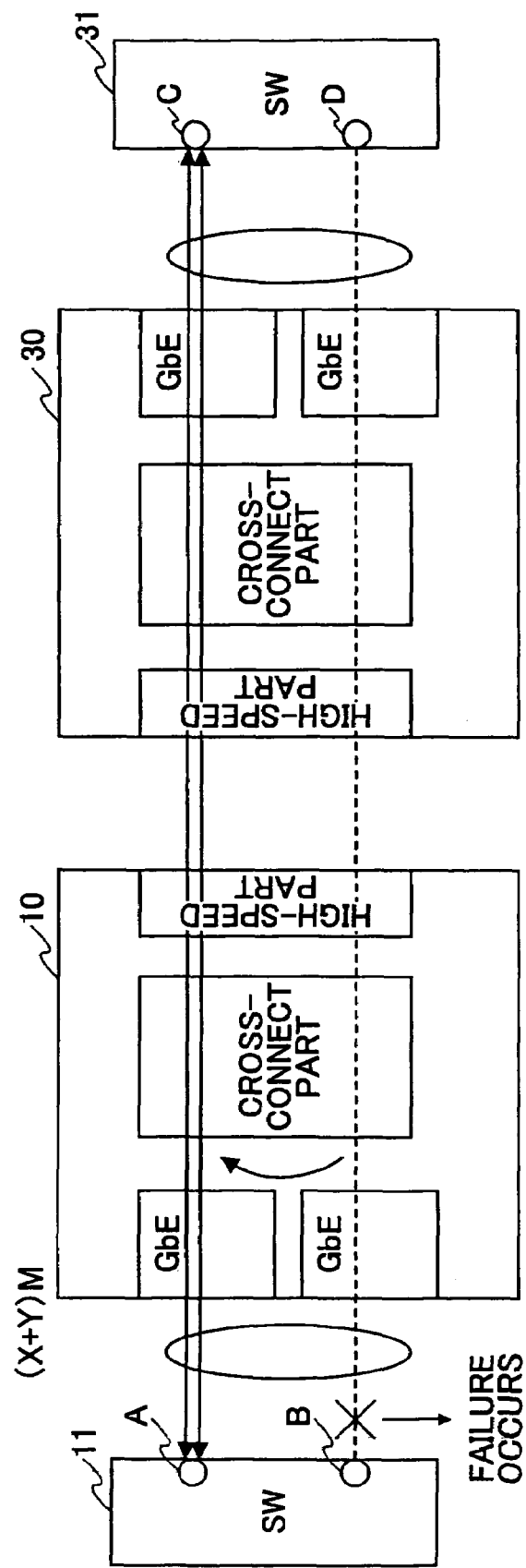
FIG. 4 is a diagram for explaining a case where a failure occurs between the switch apparatus 11 and the SDH transmission apparatus 10 in the configuration shown in FIG. 3.
Figure 5:
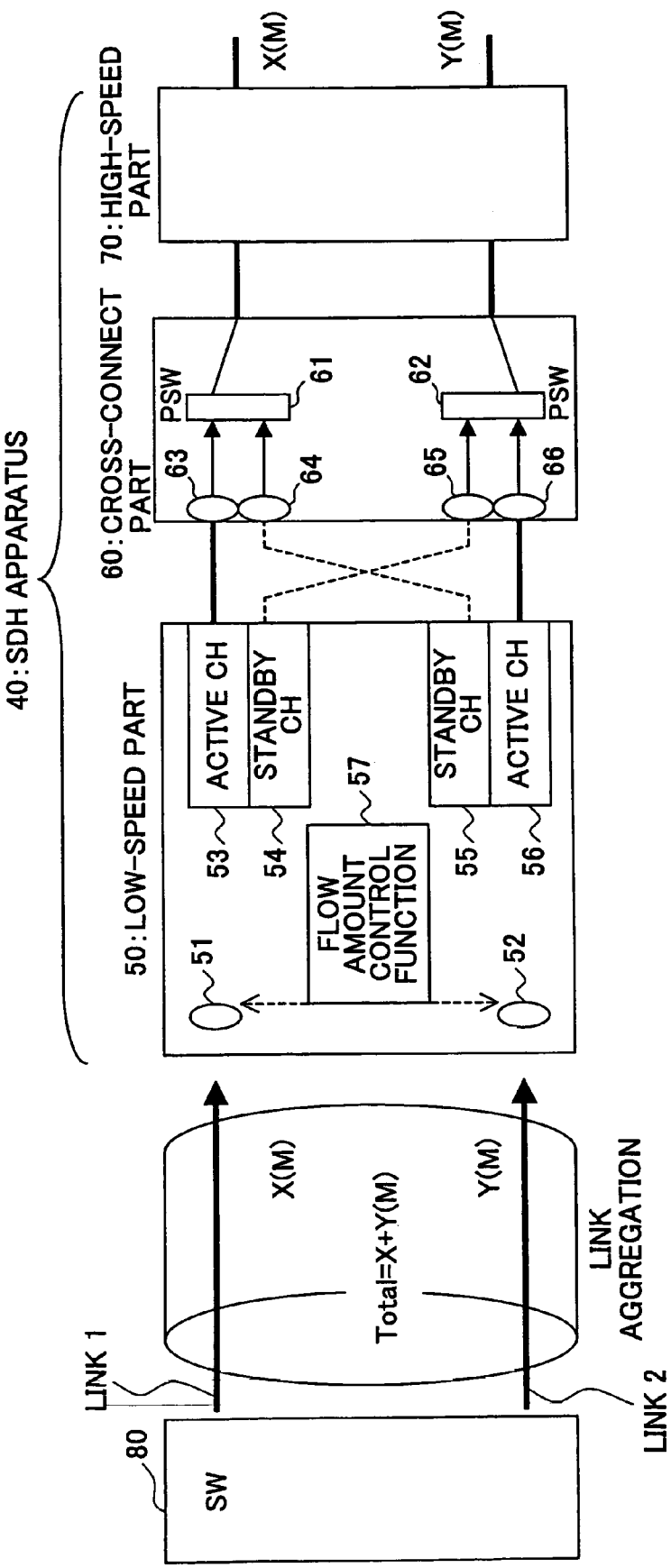
FIG. 5 is a diagram for explaining a configuration outline of an embodiment of the present invention.

As shown in FIG. 5, the SDH transmission apparatus 40 includes a low-speed part 50, a cross-connect part 60 and a high-speed part 70. A switch 80 is connected to the low-speed part 50, and the low-speed part 50 receives signals from the switch apparatus 80 in the same way as the case shown in FIG. 3. A port 51 of the low-speed part 50 receives a signal of X Mbps of the link 1, and a port 52 receives a signal of Y Mbps of the link 2.

The low-speed part 50 includes an active CH part 53 and a standby CH part 54, associated with the link 1, for transmitting a signal to the cross-connect part 60. In the same way, associated with the link 2, the low-speed part 50 includes an active CH part 55 and a standby CH part 56. In addition, a flow amount control function 57 is provided for controlling flow amount for a signal received from the switch apparatus 80.

The cross-connect part 60 includes a path switch 61 and a path switch 62 each including a function for selecting one signal from among received two signals to output the selected signal. The path switch 61 receives a signal from the active CH part 53 via the port 63, and receives a signal from the standby CH part 55 via the port 64. The path switch 62 receives a signal from the active CH part 56 via the port 66, and receives a signal from the standby CH part 54 via the port 65. Each path switch operates so as to output a signal of a path from which P-AIS (Path Alarm Indication Signal) that indicates path abnormality is not received.

Figure 6:
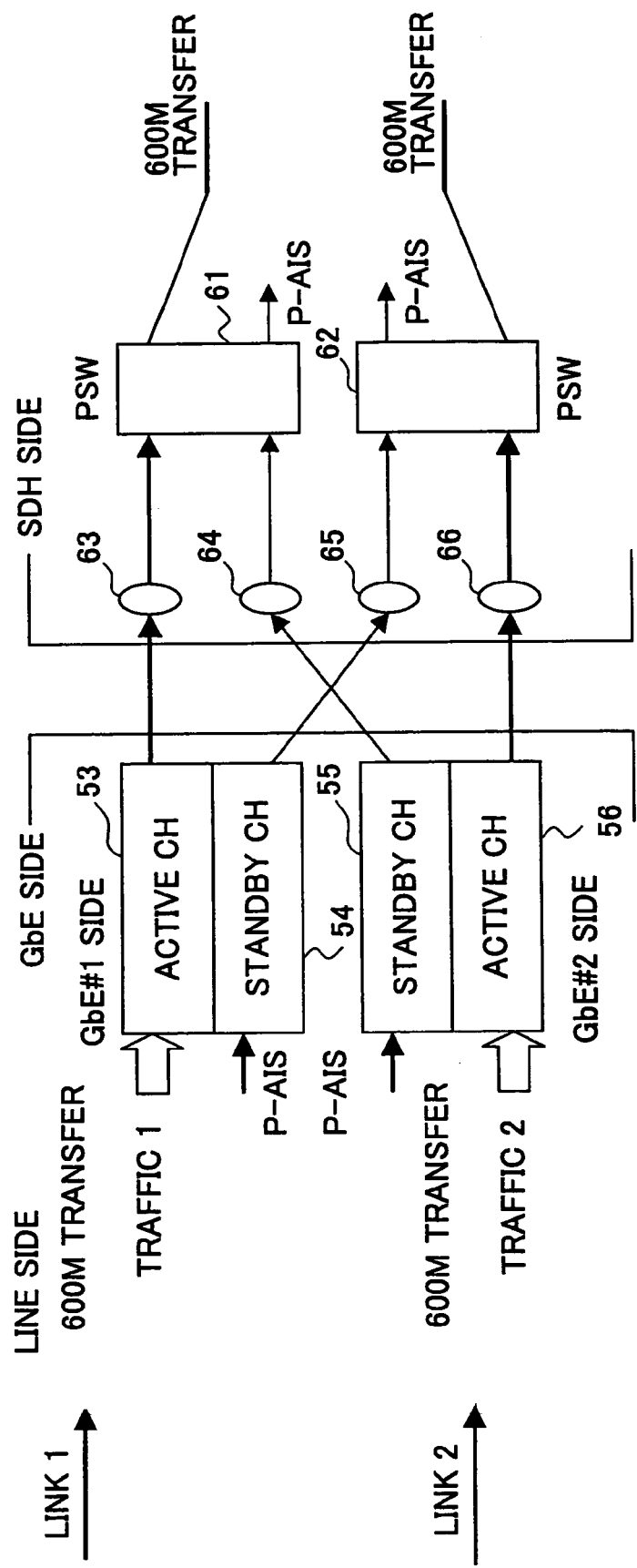
FIG. 6 is a diagram for explaining operations of the SDH transmission apparatus of an embodiment of the present invention under a normal condition.
Figure 7:
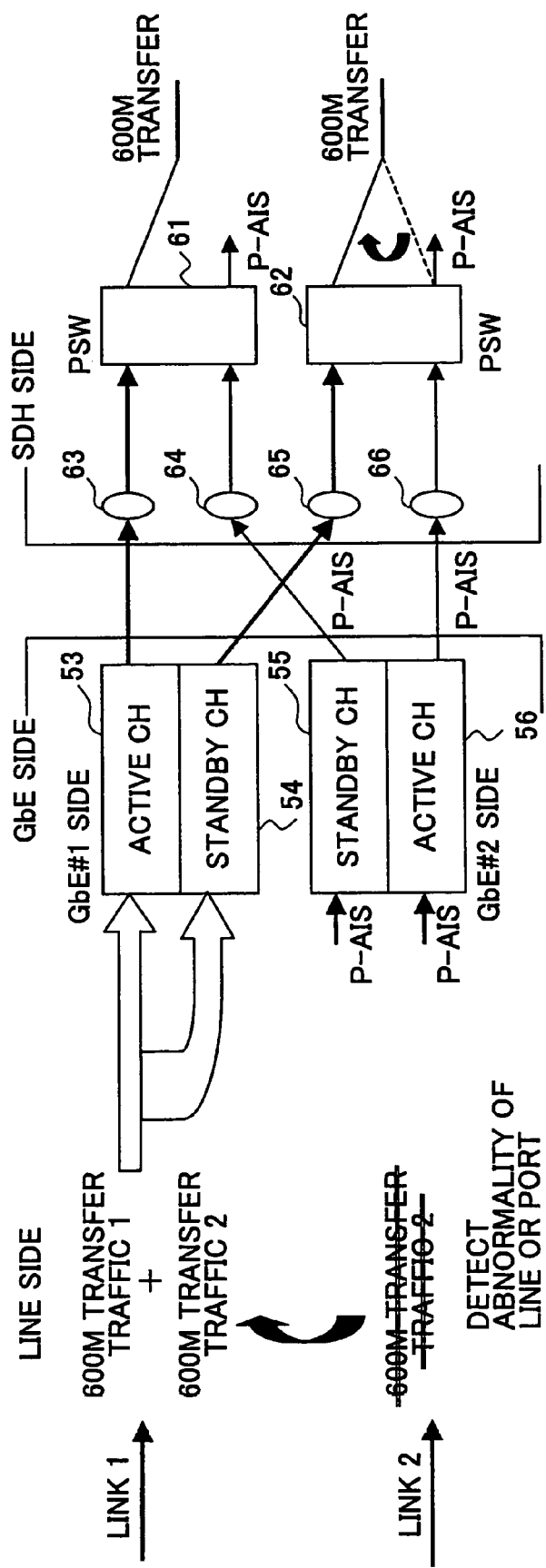
FIG. 7 is a diagram for explaining operations when a failure occurs between the switch apparatus and the SDH transmission apparatus in the configuration shown in FIG. 6.

The operation of the SDH transmission apparatus 40 having the above-mentioned configuration is described with reference to FIGS. 6 and 7. In the following, it is assumed that the low-speed part includes two Gigabit Ethernet termination parts (abbreviated to GbE#1, GbE#2) associated with the link 1 and the link 2 respectively, wherein each Gigabit Ethernet termination part terminates the Gigabit Ethernet signal from the switch apparatus side and converts the signal into an SDH signal. Each Gigabit Ethernet termination part includes the active CH part and the standby CH part. In addition, it is assumed that each of the X Mbps and the Y Mbps is 600 Mbps. FIGS. 6 and 7 mainly show parts from the active CH part/standby CH part to the path switches. By the way, the SDH transmission apparatus 40 similarly operates when fast Ethernet (FE) termination parts are used instead of the Gigabit Ethernet termination parts.

As shown in FIG. 6, under a normal condition, traffic of 600 Mbps from the link 1 is supplied to the active CH part 53, and the traffic is sent to the path switch 61 via the port 63. In addition, traffic of 600 Mbps from the link 2 is supplied to the active CH part 56, and the traffic is sent to the path switch 62 via the port 66.

The P-AIS that is transmitted when detecting a path failure is always supplied to the standby CH part 54 to which the signal from the switch apparatus 80 is not transferred, and the P-AIS is sent to the path switch 62 via the port 65. P-AIS is also supplied to the standby CH part 55 and the P-AIS is sent to the path switch 61 via the port 64.

Therefore, the path switch 61 receives the signal from the active CH part 53 and the P-AIS from the standby CH part 55. Since each path switch operates so as to select a signal of a path from which P-AIS is not received to output the selected signal to the high-speed side, the path switch 61 transfers the signal from the active CH part 53 to the high-speed part side, and the path switch 62 transfers the signal from the active CH part 56 to the high-speed side, under the normal condition. That is, the path associated with the link 1 transmits the signal conveying the 600 Mbps traffic to an opposed SDH transmission apparatus, and also the path associated with the link 2 transmits a signal conveying the 600 Mbps traffic to the opposed SDH transmission apparatus.

Next, a case where link failure between the switch apparatus 80—the low-speed part 50, or failure of an input port of the low-speed part occurs is described with reference to FIG. 7.

When the Gigabit Ethernet termination part detects the occurrence of the failure, the Gigabit Ethernet termination part transmits P-AIS to an active CH part corresponding to the failed link. That is, in the case shown in FIG. 7, since a line or a port in the link 2 side fails, the P-AIS is supplied to the active CH part 56 and the P-AIS is transmitted to the path switch 62 via the port 66.

On the other hand, due to the failure in the link 2 side, data that have been flowing on the link 2 starts to flow into the side of the link 1. In the Gigabit Ethernet termination part (GbE#1) in the link 1 side, by means of a flow amount control function, when the traffic amount of data received from the switch apparatus is less than a capacity transmittable by the active CH part 53, all received data are transmitted to the active CH part 53. When the flow control function determines that the traffic from the link 1 exceeds the capacity of the active CH part 53, the flow control function stops the P-AIS flowing to the standby CH part 54 and restricts flow of the signal into the active CH part 53 so as to transfer traffic that cannot be transmitted by the active CH part 53 to the standby CH part 54.

Then, since the path switch 62 receives the P-AIS from the active CH part 56, when the transmission of P-AIS from the standby CH part 54 stops so that a normal signal is transmitted, the port 66 is switched to the port 65 as to a selecting path. That is, the path switch 62 transmits the signal received from the standby CH part 54 to the high-speed part side.

By adopting such a configuration, even when a failure occurs in one of the links between the switch apparatus and the low-speed part, the SDH transmission apparatus can transmit signals by using a path the same as a path used when the failure does not occur. Therefore, there is no need to provide the redundant band for each path against the failure.

Figure 8:
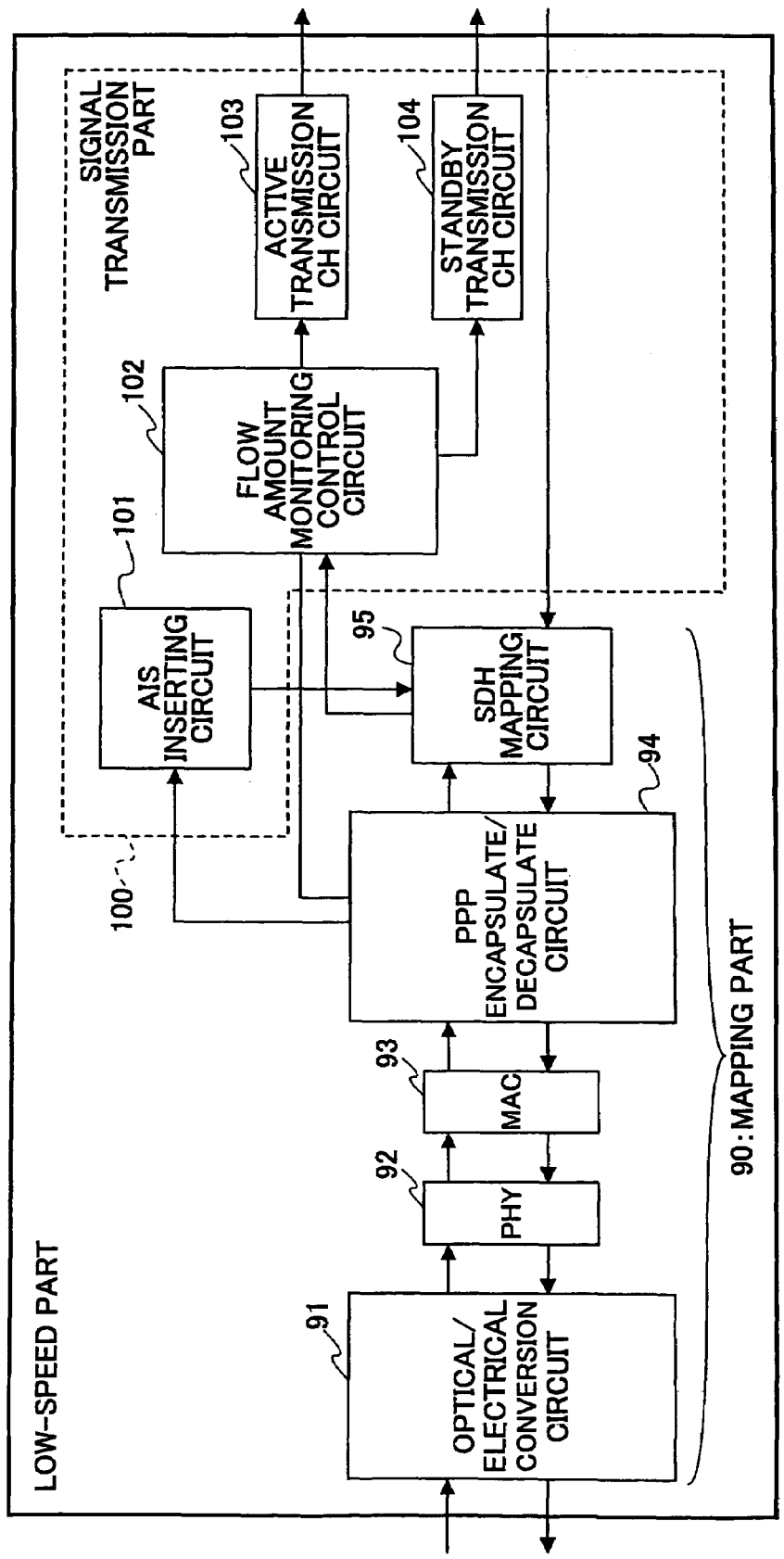
FIG. 8 is a diagram showing a configuration example of a low-speed part of the SDH transmission apparatus according to an embodiment of the present invention.

Next, the configuration of the low-speed part in the SDH transmission apparatus is described with reference to FIG. 8 in detail. As shown in the figure, the low-speed part includes a mapping part 90 for mapping a signal of the upper layer received from the switching apparatus into the SDH signal, and a signal transmission part 100 for performing operations based on the present invention. FIG. 8 shows a configuration for one channel in the low-speed part. In addition, FIG. 8 is a circuit configuration example of an Ethernet termination package mounted in the low-speed part.

The mapping part 90 includes an optical/electrical conversion circuit 91 for converting an optical signal received from the switch apparatus into an electrical signal, a PHY part 92 for performing processes of the physical layer, a MAC part 93 for performing processes in the MAC layer, a PPP encapsulate/decapsulate circuit 94, an SDH mapping circuit 95 for mapping a PPP frame into an SDH signal or converting the SDH signal into the PPP frame.

The signal transmission part 100 includes an AIS inserting circuit 101, a flow amount monitoring control circuit 102 for monitoring traffic of a received signal and distributing traffic based on the traffic amount, an active transmission CH circuit 103 and a standby transmission CH circuit 104 for transmitting a signal mapped into SDH to the path switch.

The PPP encapsulate/decapsulate circuit 94 includes a function for detecting a failure between the switch apparatus and the low-speed part to report the failure to the AIS inserting circuit 101, and a function for receiving a report from the flow amount monitoring control circuit 102 to report, to the AIS inserting circuit 101, whether to insert P-AIS into a signal to be transmitted to the standby transmission CH circuit 104. The latter report may be directly sent from the flow amount monitoring control circuit 102 to the AIS inserting circuit 101. In the following, operations related to the present invention are described.

When there is no failure between the switch apparatus and the low-speed part, when the traffic amount of the signal received from the switch apparatus by the low-speed part is less than the capacity at which the active transmission CH circuit 103 can transmit data, the flow amount monitoring control circuit 102 controls the AIS inserting circuit 101 to insert P-AIS only into the standby transmission CH circuit 104, so that the AIS inserting circuit 101 inserts the P-AIS into the signal to be transmitted to the standby transmission CH circuit 104. Accordingly, P-AIS is transmitted from the standby transmission CH circuit 104 to the path switch.

When a failure occurs between the low-speed part and the switch apparatus, the PPP encapsulate/decapsulate circuit 94 detects the failure, reports the failure to the AIS inserting circuit 101, so that the AIS inserting circuit 101 inserts P-AIS into the signal to be transmitted to the active transmission CH circuit 103.

When a failure occurs in a link, between a low-speed part and the switching apparatus, associated with a channel different from a channel for the low-speed part shown in FIG. 8 so that the signal that has been flowing on the failed link starts to flow into the circuit shown in FIG. 8, the flow amount monitoring control circuit 102 recognizes increase of traffic. Then, at the time when the traffic amount exceeds the capacity of the active transmission CH circuit 103, the AIS inserting circuit 101 is controlled to stop inserting P-AIS that has been transmitted to the standby transmission CH circuit 104. Further, the flow amount monitoring control circuit 102 performs control such that a part of traffic that exceeds the capacity is transmitted to the standby transmission CH circuit 104. Accordingly, as mentioned before, it becomes possible to transmit the traffic that exceeds the capacity on a path different from the path that transmits the signal transmitted from the active transmission CH circuit 103.

Next, the path switch of the present invention shown in FIG. 5 and the like is described.

In an ADM apparatus, that is an SDH transmission apparatus, including a function for performing Add (insertion) and Drop (separation) of a signal, a path switch for restoring a path is previously known. For example, the path switch is used for performing switching in UPSR (Unidirectional path switched ring) in a ring structure, for example. This can be called a path switch for receive-switching since a signal received from the SDH ring network side is switched when dropping the signal.

On the other hand, the path switch according to the present invention, performs switching as needed before adding (inserting) a signal from the low-speed part to a higher-order signal. Therefore, the path switch of the present invention can be called a path switch for transmit-switching.

Figure 9:
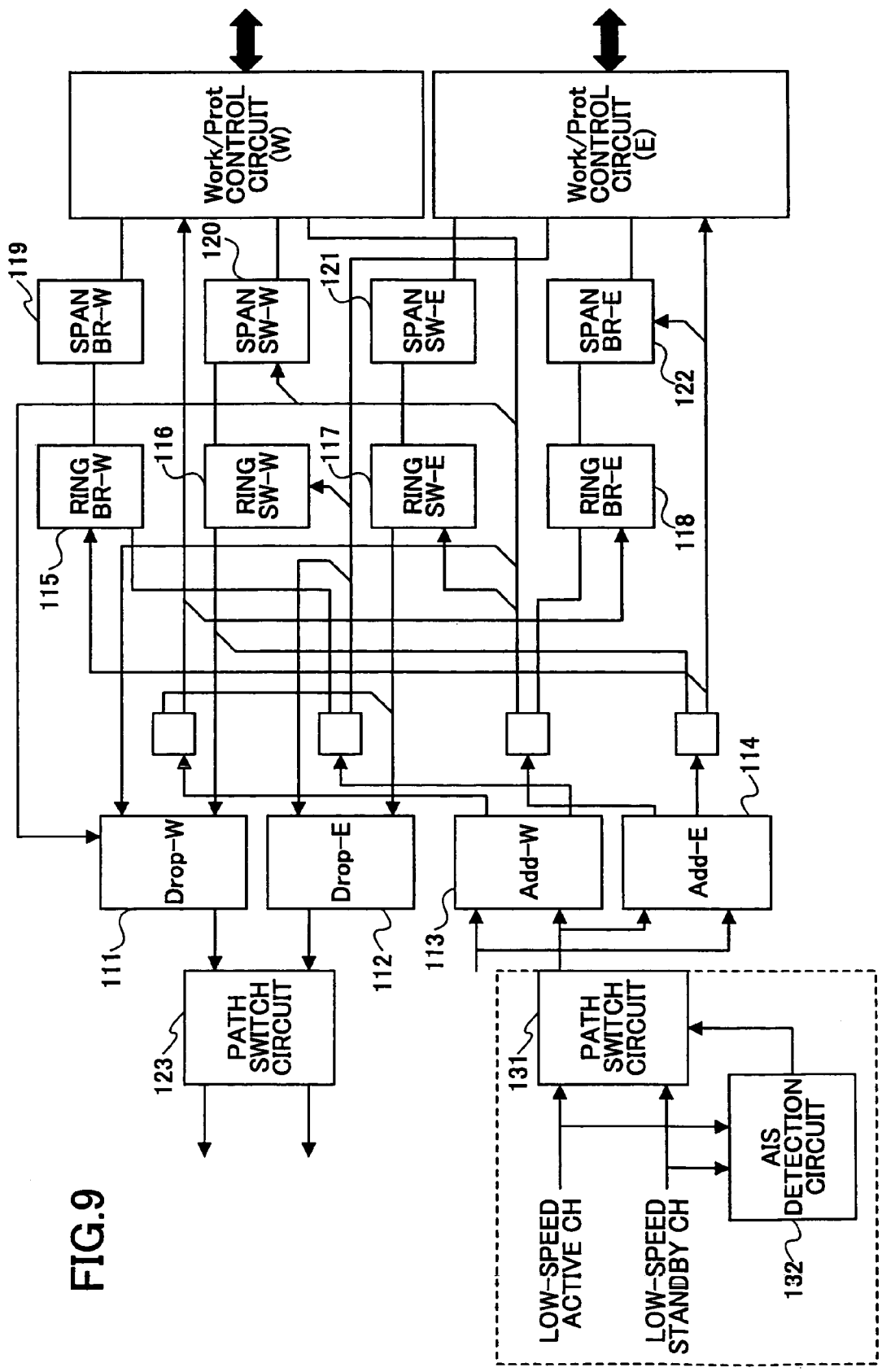
FIG. 9 is a diagram showing a configuration example of a cross-connect part of the SDH transmission apparatus including a path switch of the present invention.

FIG. 9 shows a configuration example of a cross-connect part of the SDH transmission apparatus including the above-mentioned path switch. A part enclosed by a dotted line shows the path switch that is added to a conventional cross-connect circuit. Parts other than the part enclosed by the dotted line has a configuration the same as the conventional configuration, and includes function parts 111-114 for performing add and drop of a signal, and function parts 115-122 for performing BLSR (Bidirectional line Switched ring) switching. In addition, as mentioned before, a path switch circuit 123 is provided for performing receive-switching for a signal to be dropped.

The part enclosed by the dotted line includes a path switch circuit 131 for selecting a signal from among a signal from the active CH part and a signal from the standby CH part so as to transmit the selected signal to the Add side, and an AIS detection circuit 132 for detecting P-AIS. The path switch circuit 131 operates so as to select a signal in which P-AIS is not detected from among a signal from the active CH part and a signal from the standby CH part to transmit the selected signal. In addition, the AIS detection circuit 132 detects P-AIS from the signal from the active CH part or the signal from the standby CH part, and reports detection of the P-AIS to the path switch circuit 131.

The path switch circuit may be provided after the active transmission CH circuit and the standby transmission CH circuit in the low-speed part instead of providing the path switch circuit in the cross-connect part. Although the path switch of the present embodiment selects a signal other than the P-AIS to output the selected signal, the path switch may be configured to use another signal instead of P-AIS.

As mentioned above, according to the present embodiment, when the link aggregation function is used in the switch apparatus side, bandwidth to be prepared for signal transmission between switch apparatuses is the same as bandwidth of paths bundled by the link aggregation function even when considering occurrence of failure such as port failure/line disconnection failure between the switch apparatus and the SDH transmission apparatus. That is, bandwidth twice as much as bandwidth corresponding to paths bundled by the link aggregation was necessary in the conventional configuration. On the other hand, according to the present invention, bandwidth usage can be decreased so that cost can be reduced.

The present invention is not limited to the specifically disclosed embodiments, and variations and modifications may be made without departing from the scope of the invention.

What is claimed is:

1. An SDH transmission apparatus including a low-speed part, a high-speed part, and a cross-connect part for multiplexing a signal of the low-speed part side into a signal of the high-speed part side, wherein:
    the low speed part includes a first signal transmission part and a second signal transmission part, each signal transmission part including an active transmission part and a standby transmission part;
    the SDH transmission apparatus is configured such that an active transmission part of the first signal transmission part transmits a signal to a first transmission line via the high-speed part, and an active transmission part of the second signal transmission part transmits a signal to a second transmission line via the high-speed part;
    the SDH transmission apparatus includes a transmission control part for causing a standby transmission part of the first signal transmission part to send a part of signals supplied to the first signal transmission part to the second transmission line via the high-speed part when a traffic amount of the signals supplied to the first signal transmission part exceed a predetermined value; and
    the transmission control part includes a part for receiving a signal output from the standby transmission part of the first signal transmission part and a signal output from the active transmission part of the second signal transmission part so as to select a normal signal from among the received signals and output the normal signal.

2. The SDH transmission apparatus as claimed in claim 1, the low-speed part comprising a part for supplying a transmission line abnormal signal to the standby transmission part of the first signal transmission part when the traffic amount does not exceed the predetermined value.

3. The SDH transmission apparatus as claimed in claim 2, wherein the transmission line abnormal signal supplied to the standby transmission part of the first signal transmission part is stopped when the traffic amount exceeds the predetermined value.

4. The SDH transmission apparatus as claimed in claim 1, the low-speed part comprising:
    a part for receiving a signal output from a layer 2 apparatus having a link aggregation function and mapping the received signal into an SDH signal; and
    a part for detecting a failure of a transmission line between the layer 2 apparatus and the low-speed part and supplying a signal indicating abnormality to an active transmission part of a signal transmission part corresponding to the transmission line.

5. A signal termination apparatus used as a low-speed part in an SDH transmission apparatus including the low-speed part and a high-speed part, the signal termination apparatus comprising:
    a first active transmission part and a first standby transmission part forming a first signal transmission part for transmitting a signal;
    a second active transmission part and a second standby transmission part forming a second signal transmission part for transmitting a signal; and
    a part for receiving a signal output from the first standby transmission part and a signal output from the second active transmission part so as to select a normal signal from among the received signals and output the normal signal.

6. The signal termination apparatus of claim 5, further comprising:
    a part for receiving a signal from a layer 2 apparatus that is connected to the SDH transmission apparatus, and mapping the received signal into an SDH signal.

7. The signal termination apparatus as claimed in claim 6, wherein the signal termination apparatus supplies a transmission line abnormal signal to the first standby transmission part when the traffic amount does not exceed the limit traffic amount that the first active transmission part can transmit.

8. The signal termination apparatus of claim 7, wherein the transmission line abnormal signal is stopped when the traffic amount exceeds the limit traffic amount.

9. The signal termination apparatus of claim 8, further comprising:

a part for monitoring a traffic amount of signals received from the layer 2 apparatus, and supplying a part of the signals received from the layer 2 apparatus to the first standby transmission part when the traffic amount exceeds a limit traffic amount that the first active transmission part can transmit.

10. The signal termination apparatus of claim 8, further comprising:

a part for detecting a failure of a transmission line between the layer 2 apparatus and the low-speed part and supplying a signal indicating abnormality to one of the first and second active transmission parts that corresponds to the transmission line.

11. A signal transmission method used in an SDH transmission apparatus including a low-speed part, a high-speed part, and a cross-connect part for multiplexing a signal of the low-speed part side into a signal of the high-speed part side, wherein:

the low-speed part includes a first signal transmission part and a second signal transmission part, each signal transmission part including an active transmission part and a standby transmission part;

the SDH transmission apparatus is configured such that an active transmission part of the first signal transmission part transmits a signal to a first transmission line via the high-speed part, and an active transmission part of the second signal transmission part transmits a signal to a second transmission line via the high-speed part; and the standby transmission part of the first signal transmission part sends a part of signals supplied to the first signal transmission part to the second transmission line via the high-speed part when a traffic amount of the signals supplied to the first signal transmission part exceeds a predetermined values, wherein a transmission control part in the SDH transmission apparatus receives a signal output from the standby transmission part of the first signal transmission part and a signal output from the active transmission part of the second signal transmission part so as to select a normal signal from among the received signals and output the normal signal.

12. The signal transmission method as claimed in claim 11, wherein a transmission line abnormal signal is supplied to the standby transmission part of the first signal transmission part when the traffic amount does not exceed the predetermined value.

13. The signal transmission method as claimed in claim 12, wherein the transmission line abnormal signal supplied to the standby transmission part of the first signal transmission part is stopped when the traffic amount exceeds the predetermined value.

\* \* \* \* \*